Patented Jan. 31, 1939

2,145,345

UNITED STATES PATENT OFFICE 2,145,345

MANUFACTURE OF VINYL COMPOUNDS

Henry Dreyfus, London, England

No Drawing. Application March 24, 1932, Serial No. 601,060. Renewed April 9, 1938. In Great Britain March 30, 1931

7 Claims. (Cl. 260—2)

This invention relates to new compounds containing a vinyl residue or a polyvinyl residue, and more particularly to the manufacture of compounds adapted for use as sizes or impregnating agents for textile and other materials.

It is known that by the action of acetylene on compounds containing carboxylic or hydroxyl groups under suitable conditions, particularly in the presence of mercury salts, it is possible to obtain esters or ethers of vinyl alcohol. In organic vinyl esters, for example vinyl chloride may be obtained analogously from inorganic acids. These esters or ethers may be readily polymerized, for example by subjecting them to the action of heat or light, so as to obtain resinous or rubber-like products. These polymerized esters or ethers are apparently to be regarded as esters or ethers of polyvinyl alcohols, which compounds may in fact be obtained by saponification of polymerized vinyl acetate or other polymerized vinyl ester. The flexible or rubber-like polymerization products of vinyl acetate are insoluble in water but soluble in organic solvents. They have excellent adhesive qualities and are well adapted for sizing textile yarns or threads prior to weaving but for their water-insolubility which renders difficult their subsequent removal from the materials.

I have now discovered a new class of compounds containing polyvinyl residues and characterized by the presence therein of both ester or ether groups and free hydroxyl, carboxyl, sulphonic or amino groups or other acidic, basic, or other groups which tend to render compounds containing them more readily soluble or dispersible in aqueous liquids, than compounds devoid of such groups. Such groups are hereinafter referred to as "hydrophile" groups. As compared with the known polyvinyl esters, for example polyvinyl acetate, the new polyvinyl compounds dissolve or disperse in water or other aqueous liquids with greater facility. On this account they constitute valuable materials for sizing and impregnating fibrous materials, and in particular textile yarns or other textile materials where a size or the like is required which is capable of ready removal by washing or scouring in aqueous liquids.

In the new compounds the hydroxyl group or other group of hydrophile character may be attached either directly to the polyvinyl residues or to ester or ether groups attached to the polyvinyl residues. Further the proportion of hydrophile groups relative to that of the $C_2$ groupings constituting the polyvinyl residues may vary within wide limits, and by suitably selecting this proportion compounds of almost any desired degree of solubility or dispersibility in water or other aqueous liquid may be obtained.

The new compounds may be prepared from polyvinyl alcohols by esterifying or etherifying the hydroxyl groups thereof wholly or in part with acyl or other organic residues containing hydroxyl, carboxyl or other hydrophile groups. Further a polyvinyl alcohol may be esterified or etherified in part with acyl or other organic residues of the aforesaid character and in part with acyl or other organic residues which do not contain hydrophile groups. Again, a polyvinyl alcohol may be merely in part esterified or etherified with residues not containing hydrophile groups, the remaining hydroxyl groups being left uncombined with organic residues. The esterification or etherification may be effected directly, as for example by esterifying a polyvinyl alcohol with a hydroxy carboxylic acid or by etherifying a polyvinyl alcohol with a carboxy alkyl halide, e. g., chloracetic acid, or the introduction may be effected indirectly. In the latter case a polyvinyl ester or ether containing in the ester or ether residues readily exchangeable atoms or groups, may be subjected to a treatment adapted to exchange the said atoms or groups wholly or in part for hydroxyl groups or other groups of hydrophile character. Thus for instance chlorine in a polyvinyl chloracetate may be wholly or in part replaced by hydroxyl or amino groups.

The new compounds may also be produced, either by partial hydrolysis or otherwise, from polyvinyl esters which do not contain hydroxyl or like hydrophile groups, and without the necessity of first obtaining free polyvinyl alcohol. For example, a polyvinyl ester may be partially hydrolyzed so as to replace ester groups by hydroxyl groups, or the polyvinyl ester may be otherwise treated so as to effect a direct replacement of some or all of the ester groups by hydrophile groups or ester or ether residues or other residues containing such groups. For instance polyvinyl acetate or other polyvinyl ester not containing hydrophile groups may be partially hydrolyzed and the product esterified or etherified with residues containing hydrophile groups. These latter methods are in general particularly convenient for the preparation of the new compounds.

The ester residues containing hydroxyl, carboxyl, or other hydrophile groups may be of very varied character. For example they may be residues of hydroxy-carboxylic acids, di- or poly-carboxylic acids, sulpho-carboxylic acids, or amino carboxylic acids, whether of the aliphatic, aromatic, or other series. As examples of such acids may be mentioned glycollic acid, citric acid, tartaric acid, malic acid, mandelic acid, oxalic acid, succinic acid, maleic acid, benzene di- or poly-carboxylic acids, e. g., phthalic acid, hydroxy benzene carboxylic acids, sulphobenzene carboxylic acids and amino benzene carboxylic acids.

The esterification of hydroxyl groups of a polyvinyl alcohol compound by means of the aforesaid acids may be effected in any convenient manner, for example by any of the known methods for the production of esters of organic carboxylic acids. Esterification may be effected for instance by simple heating of polyvinyl alcohol with the acid, or the anhydrides or chlorides thereof, in the presence or not of esterification catalysts, for example acids, e. g., sulphuric acid, tertiary bases, e. g., pyridine, or zinc chloride, and in the presence or not of solvents or diluents. In the case of di- or poly-carboxylic acids the quantity of such acid employed relative to that of the polyvinyl alcohol, and the conditions of esterification should be such as to ensure that the product contains carboxyl or other hydrophile groups.

The etherification of polyvinyl alcohol compounds for the production of the new compounds may similarly be effected with any suitable etherifying agents capable of introducing ether residues containing hydroxyl, carboxyl or other hydrophile groups. Such etherifying agents may be for instance organic halogen compounds containing hydroxyl, carboxylic or sulphonic groups, for example ethylene chlorhydrin, glycerin chlorhydrins, halogen carboxylic acids, e. g., chloracetic acid, or sulphonic or carboxylic acids of aralkyl halides, e. g., benzyl chloride-p-sulphonic acid. Etherification may be effected where desired or requisite in the presence of organic or inorganic bases with or without copper salts or other agents facilitating etherification reactions. Etherification may likewise be effected either in the presence or in the absence of solvents or diluents, for example water or organic liquids.

As explained previously the production of acylated or etherified derivatives of polyvinyl alcohol in which the acyl or ether radicles contain hydrophile groups may also be effected by indirect means. For instance a halogen acyl derivative or halogen ether may be prepared and treated so as to replace the halogen by hydroxyl or amino. As indicated a halogen acyl derivative of polyvinyl alcohol may be treated with ammonia so as to replace the halogen wholly or in part by amino groups. Instead of ammonia, substituted ammonias, for example alkyl, aralkyl or aryl amines may be employed and the corresponding substituted amino compounds thus obtained. Another indirect method of preparing compounds containing amino groups is to acylate or etherify polyvinyl alcohol with radicles containing nitro groups and subsequently to reduce the nitro groups to amino groups. For instance polyvinyl alcohol may be esterified with a nitro aromatic acid or etherified with a nitroaryl or nitroaralkyl residue and the resulting nitro esters or nitro ethers subsequently reduced. As examples of nitrated acylating or etherifying agents may be mentioned ortho-, meta-, or para-nitrobenzoic acid, 2:4-dinitro-chlor-benzene and nitro benzyl chloride. The acids may be employed either as such or in the form of their anhydrides or chlorides. Groups other than hydroxy or amino may be introduced by analogous methods, thus sulphonic groups may be introduced by subjecting a halogen acyl derivative or halogen ether of polyvinyl alcohol to the action of sulphites. For example chloracetate of polyvinyl alcohol, obtained for instance by polymerizing vinyl chloracetate, may be subjected to the action of sodium sulphite.

As previously indicated another method of preparing the new compounds of the present invention is to subject a polyvinyl ester to partial hydrolysis. In this manner compounds containing free hydroxyl groups may be obtained. Polyvinyl esters may for instance be subjected to the action of acid or alkaline hydrolyzing agents in restricted quantity or for a limited time and in presence or not of solvents or diluents. For example polyvinyl acetate may be partially hydrolyzed, in solution in alcohol, with caustic alkali or an acid, or again the ester may be dissolved in acetic acid containing water, and if desired a mineral acid such as sulphuric acid, and allowed to stand with or without heating until hydrolyzed to the desired degree. Polyvinyl compounds containing no hydrophile groups or a proportion of hydrophile groups insufficient for a given purpose may in fact be subjected to processes analogous to the "ripening" processes commonly applied to esterification products of cellulose in order to vary their solubility characteristics.

If desired, instead of partially hydrolyzing a polyvinyl compound, hydroxyl groups of polyvinyl alcohol may be in part acylated or etherified with radicles which do not contain such groups, for example aliphatic or aromatic acyl groups, e. g., acetyl, or stearyl, oleyl or other higher fatty acyl groups, or benzoyl groups, or alkyl or aralkyl groups, e. g., methyl, ethyl or benzyl groups.

The acid residues of a polyvinyl ester may also be replaced directly by other acid residues containing hydroxyl, carboxyl or other hydrophile groups. For instance, a polyvinyl acetate may be subjected to the action of a hydroxy carboxylic acid or di- or poly-carboxylic acid, so as to replace some or all of the acetic acid residues by residues of the corresponding hydroxy or polycarboxylic acid. Thus for example products soluble in or readily dispersible in water may be produced by heating polyvinyl acetate with citric, tartaric, oxalic or other acids of the aforesaid character in the presence or not of esterification catalysts, e. g., sulphuric or other acid or pyridine or other tertiary base. In this reaction also diluents or solvents for either the polyvinyl ester or the acid or both, for example water, may be present. By adjustment of the proportion of acid employed and the time and other conditions of the reaction, products of widely varying character as regards ease of solution or dispersion in water or other aqueous liquids may be obtained.

Polyvinyl alcohols, esters or other compounds employed as starting materials may be of any desired degree of polymerization and viscosity characteristics. For example polyvinyl alcohol of a kind yielding very viscous solutions and obtained from a highly polymerized polyvinyl acetate may be used.

In order to prepare the new compounds of the present invention it is not however essential to start with polyvinyl alcohol or other polymerized vinyl compounds. If desired vinyl esters or ethers containing free hydroxyl, carboxyl or other hydrophile groups may be prepared and undergo polymerization so as to yield compounds of the desired character. Thus a vinyl ester of one of the aforesaid hydroxy or carboxylic acids may be polymerized so as to yield a polymerized product containing free hydroxyl or carboxylic groups. The parent vinyl esters containing hydrophile groups are new and are included within the scope of the present invention. They may be prepared by the action of acetylene on hydroxy carboxylic acids or on di- or poly-carboxylic acids or on di- or poly-hydroxy compounds in the presence of salts of mercury. The reaction between the acetylene and the hydroxy or carboxylic compound is preferably effected in the presence of an inert diluent, for example a hydrocarbon. The reaction should not of course be carried out so that the acetylene combines with the whole of the hydroxy or carboxylic groups of the reacting compounds as otherwise the resulting vinyl esters or ethers would not contain free hydroxy or carboxylic groups.

Again, vinyl esters or ethers of the desired character may be prepared by the interaction of a vinyl halide and a compound containing a hydroxy, carboxy, amino or other group possessing easily replaceable hydrogen and at least one other hydrophile group. The reaction may be effected in the presence of substances binding acid or, where hydroxyl or carboxyl groups are required to react, the compounds may be employed in the form of alkali or other metal derivatives. Thus sodium salts of glycol, glycerol or glycollic acid may be allowed to react with vinyl chloride in such proportions as to yield vinyl derivatives containing hydroxyl or carboxyl groups.

The vinyl esters or ethers containing hydrophile groups, prepared in the aforementioned manner, may subsequently be polymerized by subjecting them to the action of heat and/or light in the presence or absence of diluents, and in the presence or absence of substances facilitating the reaction, for instance organic peroxides such as a benzoyl peroxide. If desired mixtures of two or more of the new esters or ethers or of one or more of the new esters or ethers with another vinyl ester or ether may be polymerized, whereby products may be obtained of varied character according to the proportions of the different esters employed.

Though reference has been made only to compounds containing the vinyl group, that is the group $CH_2=CH-$, the present invention extends also to analogous compounds in which hydrogen atoms of the vinyl residue are replaced by other atoms or groups. Thus a polymerized substituted polyvinyl alcohol may be etherified or esterified with residues containing hydrophile groups in accordance with the invention. Again a polymerized substituted vinyl ester may be subjected to partial saponification so as to obtain a product containing free hydroxyl groups, or it may be subjected to treatment adapted to replace acid residues by other acid residues containing hydroxyl, carboxyl or other hydrophile groups. For example ethers or esters or other compounds may be produced from β-chlor-propylene instead of from vinyl halides as previously described.

The invention is illustrated but not limited by the following examples:

*Example 1*

5 parts of polyvinyl acetate, obtained for instance by polymerized vinyl acetate, are boiled under a reflux condenser with 30 parts of lactic acid of 75 per cent. strength until a sample of the product, freed from excess lactic acid, shows the desired degree of solubility in water or dilute alkali. The entire product is then separated from excess lactic acid and may be used for sizing textile yarn in the manner described in U. S. application S. No. 497,330, filed November 21, 1930.

A similar product may be obtained by replacing the lactic acid by tartaric or citric acid.

*Example 2*

10 parts of polyvinyl acetate are dissolved in 50 parts of acetic acid of 90 per cent. strength containing 1 part of sulphuric acid. The mixture is then maintained at 40–60° C. until a sample of the product is soluble in aqueous alcohol of 30–50 per cent. strength. After separating from the acetic acid, e. g., by dilution with water and dialysis, the product may be used for sizing textile yarns.

*Example 3*

10 parts of polyvinyl alcohol are well mixed with 4.5 parts caustic soda and 30 parts of water. 15 parts of sodium chloracetate are then added and the whole kneaded at about 50° C. for 1–2 hours. The reaction product is then taken up with water and may be used as a size. If desired the product, a sodium salt, may be first treated with acid to neutralize excess alkali or to liberate the free acid. In either case the material may if desired be freed from water-soluble salts, e. g., by dialysis. The sodium chloracetate may be replaced by the sodium salt of benzyl-chloride-p-sulphonic acid and sulphonated benzyl ethers obtained.

Partially esterified products obtained as in this example may if desired be further etherified or esterified, and the further radicles may or may not contain hydrophile groups.

*Example 4*

25 parts of metallic sodium are dissolved in about 250 parts of glycol contained in an autoclave provided with stirring mechanism. 70 parts of vinyl chloride are then introduced and the whole heated, while stirring, for several hours to 80–100° C. until the pressure in the autoclave ceases to fall materially. After cooling, and preferably after separation from the sodium chloride formed, the glycol mono vinyl ether is, by virtue of its lower boiling point, isolated from the excess of glycol by distillation under diminished pressure.

The fraction boiling at 110°–150° C. may be directly utilized for conversion by polymerization into a solid product readily dispersed in water. For this purpose the fraction in question is mixed with about 0.5 to 1 per cent. of its weight of benzoyl peroxide and subjected, while warming under a reflux condenser, to the radiation from a quartz mercury vapour lamp. The polymerized product may be taken up in water and used directly for sizing purposes.

*Example 5*

150 parts of dry succinic acid mono potassium salt, 400 parts of toluene and 65 parts of vinyl chloride are heated in an autoclave, while well stirring, to 100–130° C. until the pressure ceases to fall appreciably. The reaction product is then filtered to remove the potassium chloride formed and the toluene is distilled off from the higher boiling vinyl succinic ester under reduced pressure.

What I claim and desire to secure by Letters Patent is:

1. Process for the production of a carboxymethyl ether of a polyvinyl alcohol which comprises etherifying a polyvinyl alcohol with chloroacetic acid.

2. A polyvinyl ether wherein an ether radical contains a carboxyl group, said ether being, as such or in the form of its salts, a water-soluble compound useful as a size.

3. A carboxy-methyl ether of a polyvinyl alcohol.

4. Process for the production of a polyvinyl ether containing salt-forming groups and soluble in aqueous media, which comprises the etherification of a polyvinyl compound containing OH groups directly attached to the polyvinyl residue with an etherifying agent containing a salt-forming group in addition to an etherifying group.

5. Process for the production of a polyvinyl ether containing salt-forming groups and soluble in aqueous media, which comprises etherifying polyvinyl alcohol with an etherifying agent containing an acid group in addition to an etherifying group.

6. Process for the production of a polyvinyl ether containing salt-forming groups and soluble in aqueous media, which comprises etherifying polyvinyl alcohol with an etherifying agent containing a carboxyl group in addition to an etherifying group.

7. A polyvinyl ether wherein an ether radicle contains a salt-forming group selected from the group consisting of carboxylic, sulphonic and amino groups, the said ether being, as such or in the form of its salts, a water-soluble compound useful as a size.

HENRY DREYFUS.